United States Patent Office 2,885,371
Patented May 5, 1959

2,885,371

PROCESS FOR THE PRODUCTION OF CATION EXCHANGE RESINS OF THE CARBOXYLIC TYPE

Lorenzo Tavani, Castellanza, and Marcello Morini, Legnano, Italy, assignors to Montecatini-Società Generale per l'Industria Mineraria e Chimica, a corporation of Italy No Drawing. Application March 21, 1955
Serial No. 495,811

Claims priority, application Italy March 27, 1954

12 Claims. (Cl. 260—2.2)

The present invention relates to a process for the production of cation exchange resins of the carboxylic type. More particularly, it is the object of the present invention to produce cation exchange resins consisting of a saponified copolymer, obtained by copolymerizing acrylonitrile with monovinyl or divinyl compounds, followed by saponification. The carboxylic cation exchange resins obtained by this process have excellent technological and exchange properties and such a stability against physical and chemical agents so as to allow their successful use in ion exchange processes.

Carboxylic-type exchange resins from acrylic acid and divinylbenzene or divinyl component copolymers from phenol-based compounds containing COOH-groups (salicylic acid, etc.), or from amino-acid condensates, etc., are already known. However, the preparation of the first group of these resins is relatively high in cost because of the expensive raw materials (acrylic esters), while resins of the second group are rather inferior as exchange resins and in their resistance against physical and chemical influences.

The cation exchange resins obtained according to this process have economic advantages if compared with related exchange resins obtained from acrylic ester and divinylbenzene or other divinyl components, or from acrylic acid and divinylbenzene, because of the price differential between acrylonitrile and acrylic ester or acid. Moreover, the physical properties of these new exchange resins are comparable with those of the best exchange materials known to this date.

According to the present invention, the copolymer is obtained in the form of pearls, about 0.2-0.5 mm. in diameter, by copolymerizing the monomeric mixture dispersed in an aqueous phase containing suspension aids or agents capable of producing colloidal solutions. The agents which can be used for this purpose include numerous materials in powder form, such as alkaline-earth metal phosphates, silicates and carbonates; or starch, gelatine, sodium polymethacrylate, soluble inorganic salts, etc.

The best results are obtained when using a medium viscosity polyvinyl alcohol solution; the polyvinyl alcohol does not affect the pH of the dispersion, which must be kept below 5, and thus produces the highest yields and highest uniformity of the copolymer. The monomeric mixture containing a peroxide catalyst is kept in dispersion, while stirring, and heated until copolymerization in form of pearls is completed.

The monomeric mixture consists, besides acrylonitrile, which represents the principal portion, of a divinyl compound, preferably divinylbenzene (DVB) and, as a third component, an acrylic or methacrylic ester, a water-insoluble maleic acid ester, or a vinyl ester, such as vinyl acetate, and the like, viz. compounds having a double bond susceptible of opening so as to yield a polymer.

As it is known, divinylbenzene, methacrylic anhydride, glycol methacrylate, glycol acrylate, allyl acrylate, allyl methacrylate, and the like form cross-linkages between the straight copolymeric chains, making the copolymer insoluble and infusible, both during the subsequent saponification step and later while the finished resin is exposed to operating conditions. Since the cross-linking agent does not participate in the ion exchange, it is advisable to limit the ratio thereof to a minimum. On the other hand, the percent ratio of the cross-linking agent should not be too small, since otherwise copolymers are obtained having poor stability against chemical and physical influences. As previously stated, divinylbenzene is the preferred divinyl component. Parenthetically, the difficulty of obtaining pure divinylbenzene is no deterrent; we found that excellent results can be obtained with a commercial product consisting of a mixture of divinylbenzene, ethylvinylbenzene (EVB) and high boiling saturated compounds, e.g. a product having the following composition:

| | Percent |
|---|---|
| DVB | 50 |
| EVB | 40 |
| Saturated compounds | 10 |

When preparing an acrylonitrile-divinylbenzene copolymer in an aqueous medium, considerable difficulties are encountered in obtaining a homogeneous product free from pure polyacrylonitrile fractions; because of the different polymerization rate and the high solubility of the monomeric acrylonitrile in water, a separate polymerization takes place in the aqueous phase in which very little divinylbenzene participates.

It has now been found that by introducing into the monomeric mixture small quantities of a third, water-insoluble component which, however, is soluble in, or a solvent for, the two reacting monomers and preferably, but not necessarily, participates actively in the ion exchange after the saponification, the homogeneousness of the final copolymer can be considerably increased since such an addition reduces the tendency of the acrylonitrile to polymerize on its own.

In particular, this third component may be, as said before, either a methacrylic or acrylic ester, or a water-insoluble maleic acid ester, Vinyl esters, such as vinyl acetate, are also very suitable for this purpose. The function of the third component, as already stated, is that of making the acrylonitrile compatible for copolymerization with the divinyl compound. Therefore, it is used in the smallest possible quantity, depending upon the nature of this third component. In fact, from 2 to 10 molar percent of the third component, based on the total amount of monomers, is entirely sufficient. Organic peroxides, especially benzoyl peroxide, may be used as polymerization catalysts. The equipment can be of any suitable type. The copolymerization according to this process is carried out at 50°–80° C., preferably 60° C., and in dispersion, with or without the use of pressure.

The process of the present invention calls for 65 to 85 parts, preferably 72 to 77 parts, of acrylonitrile, and from 5 to 20 parts, preferably 10 parts, of the divinyl compound. In the subsequent saponification stage, the copolymer pearls can be heat-treated with an alkali or acid solution of high concentration in order to attain hydration of the CN-group and eventually of the esterified groups which are present. However, such a saponification process has a somewhat destructive effect upon the copolymer pearls; their resistance against physical and chemical influences decreases.

It has been found that it is possible to reduce this destructive effect to a minimum and, consequently, to obtain a carboxylic resin having the best stability characteristics, by swelling the copolymer granules with a solvent before saponification, so as to make them permeable to alkali solutions and thus avoid scaling or weakening of the pearls, which occurs in case of rigid granules directly saponified with alkalies or acids of high concentrations. All solvents for the polyacrylonitrile are suitable for this purpose; dimethylformamide, dimethylsulfone, concentrated zinc chloride solutions or sulfuric acid of proper concentration. In particular, it has been found that by swelling the copolymer with a sulfuric acid solution of 60 to 90%, preferably 80%, concentration and at temperatures from $-10°$ to $+20°$ C., preferably from 0° to 5° C., and saponifying afterwards with an NaOH solution of 1 to 40% and at temperatures ranging from 30 to 100° C., preferably 80° C., a resin with excellent physical and chemical properties is obtained. This procedure allows to carry out the saponification within a relatively short period of time (two to three hours).

A preferred alternative process also resulting in an end product of excellent chemical and physical properties comprises a direct treating of un-swelled resin granules with an NaOH solution of a concentration not higher than 10%, preferably not higher than 5%, at refluxing temperatures for a period of time not less than ten hours. This treatment may be carried out either in an aqueous solution or in alcoholic NaOH solution, or in a water-alcohol mixture and with various alcohols so as to obtain the desired reaction temperature.

The following examples are presented to illustrate, but in no way to restrict, the scope of the herein-claimed invention.

*Example 1*

500 cc. of water and 10 g. of medium viscosity polyvinyl alcohol are poured into a 4-neck flask of three liters capacity, fitted with a thermometer, mechanical stirrer, refluxing condenser and nitrogen inlet tube. As soon as the polyvinyl alcohol is dissolved while stirring, a mixture consisting of 300 g. of acrylonitrile, 30 g. of methyl acrylate, 50 g. of commercial 50% divinylbenzene and 10 g. of benzoyl peroxide is added to the content of the flask. The dispersion is adjusted to pH 5 and is then heated for three hours to 60° C. while a stream of nitrogen is passed through the flask. After cooling, the solid copolymer pearls are separated from the liquid by decanting and filtering. They are then air-dried.

*Example 2*

A mixture consisting of 380 g. of acrylonitrile, 20 g. of methyl methacrylate, 100 g. of 50% divinylbenzene and 10 g. of benzoyl peroxide is poured, while stirring, into the flask containing the aqueous polyvinyl alcohol solution of Example 1. Proceeding as described in Example 1, the copolymer is obtained in the form of pearls, which are separated from the solution and air-dried.

*Example 3*

Proceeding as described in Examples 1 and 2, a copolymer is prepared from a monomeric mixture consisting of 300 g. of acrylonitrile, 80 g. of diisobutyl maleate, 80 g. of 50% divinylbenzene and 10 g. of benzoyl peroxide. The copolymer in the form of pearls is separated and dried as described above.

*Example 4*

Proceeding as described in Examples 1–3, a copolymer is prepared from 300 g. of acrylonitrile, 60 g. of vinyl acetate, 50 g. of 50% divinylbenzene and 10 g. of benzoyl peroxide. The copolymer in the form of pearls is separated and dried as described above.

*Example 5*

Proceeding as described in any of the Examples 1–4, except that divinylbenzene is replaced by either one of the following: metacrylic anhydride, glycol methacrylate, glycol acrylate, allyl methacrylate, allyl acrylate; and polyvinyl alcohol as suspension aid is replaced by either one of the following: sodium polymethylacrylate, alkali-earth metal phosphates, silicates, carbonates, starch and gelatine.

*Example 6*

1000 cc. of 80% $H_2SO_4$ are poured into a beaker of two liters capacity, fitted with a mechanical stirrer and a thermometer, and placed in ice cold water. While stirring, the temperature of the acid is reduced to 5° C.; then 150 g. of copolymer pearls, prepared as described in Example 1, are added. The mixture is kept at 5° C., while stirring, for two hours, during which time the copolymer pearls swell. Then the whole is diluted abundantly with ice water, the pearls are separated from the liquid and are then washed with water until free of the acid. The pearls thus swelled and washed are introduced into a 3-neck flask of one-liter capacity, fitted with a thermometer, mechanical stirrer and refluxing condenser, together with 500 cc. of a 30% NaOH solution and 50 cc. of ethyl alcohol. The whole is heated to 80° C., while stirring for three hours, and is then diluted with water; the pearls are separated and washed, while stirring, with 1000 cc. of 10% HCl and finally with water until complete removal of the acid. The resin has excellent cation exchange properties, is easily regenerated and can be repeatedly used for cation absorption. The exchange capacity of the resin is 88 g. of $CaCO_3$ per column liter.

*Example 7*

50 g. of copolymer as described in Example 1 are saponified with 500 g. of a 10% methyl alcoholic solution of NaOH. The process is carried out in a one-liter flask, fitted with stirrer and refluxing condenser, while keeping the mass boiling for twenty hours. At the end of the reaction, the excess of caustic soda can be recovered by simple filtration of the mixture since the resin is insoluble in the alcoholic liquid.

The resin obtained has an exchange capacity of 90 g. of $CaCO_3$ per column liter.

*Example 8*

50 g. of the copolymer of Example 2 are saponified with 1000 gr. of a 5% aqueous NaOH solution. The process is carried out as in Example 7 at boiling temperature, but for a period of ten hours. The resulting resin has an exchange capacity of 95 g. of $CaCO_3$ per column liter.

*Example 9*

The copolymer of Example 3 is swelled and saponified as described in Example 6.

*Example 10*

A copolymer of Example 5 is swelled and saponified as described in Example 6.

We claim:

1. The process of preparing a carboxylic-type cation-exchange resin which comprises preparing an aqueous dispersion of 65 to 85 parts of monomeric acrylonitrile and 5 to 20 parts of a monomeric compound taken from the group consisting of divinylbenzene, methacrylic anhydride, glycol methacrylate, glycol acrylate, allyl methacrylate, allyl acrylate and mixtures of divinylbenzene, ethylvinyl benzene and high boiling saturated compounds, in the presence of 2 to 10 molar percent, based on said monomers, of a compound taken from the group consisting of acrylic-, methacrylic-, and water-insoluble maleic esters with lower alcohols and esters of vinyl alcohol with lower aliphatic acids, a suspension aid taken from the group consisting of polyvinyl alcohol, sodium polymethacrylate, alkali-earth metal phosphates, silicates, carbonates, starch and gelatine, and an organic peroxide catalyst, adjusting to a pH of 5, heating to 50–80° C. while stirring in an atmosphere of nitrogen, and separating the resulting copolymer in form of pearls from the liquid and saponifying the copolymer.

2. The process of preparing a carboxylic-type cation-exchange resin in form of pearls 0.2 to 0.5 mm. in diameter, which comprises preparing an aqueous dispersion of 72 to 77 parts of monomeric acrylonitrile and 10 parts of divinylbenzene, in the presence of 2 to 10 molar percent, based on said monomers, of a compound taken from the group consisting of acrylic-, methacrylic-, and water-insoluble maleic esters with lower alcohols and esters of vinyl alcohol with lower aliphatic acids, a polyvinyl alcohol as suspension aid and benzoyl peroxide, adjusting to a pH of 5, heating for about three hours to 60° C. while stirring in an atmosphere of nitrogen, separating the resulting copolymer in form of pearls from the liquid and saponifying the copolymer.

3. The process according to claim 1, wherein, prior to said saponification, the copolymer pearls are treated with a swelling agent taken from the group consisting of dimethylformamide, dimethylsulfone and concentrated aqueous zinc chloride solution, and the saponification is carried out by treating with a 1 to 40% aqueous sodium hydroxide solution at 30 to 100° C.

4. The process according to claim 3, wherein the copolymer pearls are treated for about two hours in 80% sulfuric acid at a temperature from −10 to +20° C., and the saponification is carried out by heating for about three hours with an approximately 30% alcoholized aqueous sodium hydroxide solution at 80° C.

5. The process according to claim 1, wherein a mixture of divinyl benzene, ethylvinyl benzene and high boiling saturated compounds is used in lieu of said divinyl benzene.

6. The process according to claim 5, wherein the proportions of said mixture are about 50% by weight of divinyl benzene, about 40% by weight of ethylvinyl benzene and about 10% by weight of high boiling saturated compounds.

7. The process according to claim 2, wherein methyl acrylate is used as an acrylic ester.

8. The process according to claim 2, wherein methyl methacrylate is used as a methacrylic ester.

9. The process according to claim 2, wherein diisobutyl maleate is used as a maleic ester.

10. The process according to claim 2, wherein vinyl acetate is used as a vinyl ester.

11. The process according to claim 2, wherein, prior to said saponification, the copolymer pearls are treated with a 60 to 90% aqueous sulfuric acid at a temperature from −10° C. to +20° C. and the saponification is carried out by treating with a 1 to 40% aqueous sodium hydroxide solution at not higher than 80° C.

12. The process according to claim 2, wherein said saponification is carried out by treating said pearls with a sodium hydroxide solution of the class consisting of aqueous, alcoholic and aqueous-alcoholic sodium hydroxide solutions of a concentration not higher than 10%, at refluxing temperature for a period of time not less than ten hours.

References Cited in the file of this patent

UNITED STATES PATENTS

| | | |
|---|---|---|
| 2,340,109 | D'Alelio | Jan. 25, 1944 |
| 2,340,111 | D'Alelio | Jan. 25, 1944 |
| 2,417,293 | D'Alelio | Mar. 11, 1947 |
| 2,678,306 | Ferris | May 11, 1954 |
| 2,731,408 | Clarke | Jan. 17, 1956 |
| 2,783,212 | Schnell | Feb. 26, 1957 |
| 2,787,561 | Sanders | Sept. 2, 1957 |